(12) United States Patent
Surendranath et al.

(10) Patent No.: US 10,650,981 B2
(45) Date of Patent: May 12, 2020

(54) FLUORINATED COATINGS FOR HIGH PERFORMANCE ELECTRODES

(71) Applicant: Massachusetts Institute of Technology, Cambridge, MA (US)

(72) Inventors: Yogesh Surendranath, Cambridge, MA (US); Stefan M. Kilyanek, Fayetteville, AR (US); Sterling B. Chu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 134 days.

(21) Appl. No.: 15/012,089

(22) Filed: Feb. 1, 2016

(65) Prior Publication Data

US 2016/0226072 A1    Aug. 4, 2016

Related U.S. Application Data

(60) Provisional application No. 62/109,869, filed on Jan. 30, 2015.

(51) Int. Cl.
| | |
|---|---|
| *H01M 4/66* | (2006.01) |
| *H01G 9/042* | (2006.01) |
| *H01M 10/0525* | (2010.01) |
| *H01M 4/90* | (2006.01) |
| *H01M 8/18* | (2006.01) |

(Continued)

(52) U.S. Cl.
CPC ......... *H01G 9/042* (2013.01); *C25B 11/0405* (2013.01); *C25B 11/12* (2013.01); *C25B 11/14* (2013.01); *H01G 11/26* (2013.01); *H01G 11/38* (2013.01); *H01M 4/587* (2013.01); *H01M 4/96* (2013.01); *H01M 8/20* (2013.01); *H01G 11/50* (2013.01); *H01M 4/049* (2013.01); *H01M 4/9083* (2013.01); *H01M 8/188* (2013.01); *H01M 10/054* (2013.01);

(Continued)

(58) Field of Classification Search
None
See application file for complete search history.

(56) References Cited

U.S. PATENT DOCUMENTS

| | | |
|---|---|---|
| 4,551,220 A | 11/1985 | Oda et al. |
| 5,116,592 A | 5/1992 | Weinberg |

(Continued)

FOREIGN PATENT DOCUMENTS

WO    WO-2014/032005 A1    2/2014

OTHER PUBLICATIONS

Pandolfo et al., "Carbon properties and their role in supercapacitors" Journal of Power Sources 157 (2006) pp. 11-27; copy attached as a PDF, available online Apr. 4, 2006 at www.sciencedirect.com.*

(Continued)

*Primary Examiner* — Katie L. Hammer
(74) *Attorney, Agent, or Firm* — Foley Hoag LLP (57) ABSTRACT

Disclosed herein is an electrode material comprising a carbon-containing substrate, comprising a surface and a plurality of $R_F$ moieties wherein each $R_F$ moiety is covalently bound to the surface; and each $R_F$ moiety comprises a fluorine atom. Also, disclosed herein is a method of preparing an electrode material.

18 Claims, 12 Drawing Sheets

Passivated Electrode Material 200

(51) Int. Cl.

| | | |
|---|---|---|
| *H01M 8/20* | (2006.01) | |
| *C25B 11/12* | (2006.01) | |
| *C25B 11/06* | (2006.01) | |
| *H01M 4/96* | (2006.01) | |
| *H01M 4/587* | (2010.01) | |
| *C25B 11/14* | (2006.01) | |
| *H01G 11/26* | (2013.01) | |
| *H01G 11/38* | (2013.01) | |
| *C25B 11/04* | (2006.01) | |
| *H01M 8/1018* | (2016.01) | |
| *H01M 10/054* | (2010.01) | |
| *H01G 11/50* | (2013.01) | |
| *H01M 4/04* | (2006.01) | |

(52) U.S. Cl.
CPC ...... *H01M 10/0525* (2013.01); *H01M 2008/1095* (2013.01); *Y02E 60/13* (2013.01); *Y02E 60/528* (2013.01)

(56) References Cited

U.S. PATENT DOCUMENTS

| | | | | |
|---|---|---|---|---|
| 2007/0231696 | A1* | 10/2007 | Yazami | B82Y 30/00 429/231.7 |
| 2011/0014548 | A1* | 1/2011 | Blunk | H01M 8/0206 429/518 |
| 2011/0068290 | A1* | 3/2011 | Haddon | C12Q 1/6881 252/62.51 R |
| 2011/0186818 | A1* | 8/2011 | Bowers | H01L 21/04 257/29 |
| 2011/0200912 | A1* | 8/2011 | Langry | H01M 8/0252 429/492 |
| 2014/0332413 | A1 | 11/2014 | Crawford et al. | |
| 2015/0122800 | A1* | 5/2015 | Gallastegui | B82Y 40/00 219/553 |

OTHER PUBLICATIONS

International Search Report and Written Opinion dated May 26, 2016 in International Application No. PCT/US16/15921.

\* cited by examiner

FLUORINATED COATINGS FOR HIGH PERFORMANCE ELECTRODES

RELATED APPLICATION

This application claims the benefit or priority to U.S. Provisional Patent Application Ser. No. 62/109,869, filed Jan. 30, 2015; the contents of which are hereby incorporated by reference.

GOVERNMENT SUPPORT

This invention was made with Government support under Contract No. FA8721-05-C-0002 awarded by the U.S. Air Force. The Government has certain rights in the invention.

BACKGROUND OF THE INVENTION

Nearly all modern electrochemical energy conversion devices, including fuel cells, batteries, and electrolyzers, utilize high surface area graphitic carbon to pass charge to the active components of the device. The high surface area carbon serves to maintain a catalyst dispersion, to provide a mesoporous network suited to efficient mass transport, and to provide low resistance to charge transfer to the active phase of the device. But under the harsh electrochemical conditions typical of these devices, this carbon support is susceptible to corrosion, a principal cause of premature device failure. Moreover, surface oxides formed during degradation of the carbon support catalyze the generation of hydrogen gas, compromising device safety and eroding system efficiency.

Carbon, in all its allotropes, is thermodynamically unstable with respect to oxidation to $CO_2$. Indeed, the thermodynamic potential for the oxidation of graphitic carbon to $CO_2$, $$C + 2H_2O \rightarrow CO_2 + 4H^+ + 4e^-  \quad \text{Equation (1)}$$

is 0.207 V vs a normalized hydrogen electrode (NHE)—nearly a volt lower than the potentials typical of polymer electrolyte membrane (PEM) fuel cells and high potential lithium ion and lithium air batteries. The following generic corrosion sequence is the likely consequence:

Equation (2)

in which $C_s$ denotes a surface carbon atom. The first step in the sequence, the oxidation of a carbon-hydrogen bond, is presumed to be rate limiting. Under the oxidizing environments found in fuel cell, lithium ion, and lithium air battery cathodes, the oxidation events proceed via reactive oxygen species such as superoxide or high potential metal oxides. As such, the elementary surface reaction that initiates the oxidation cascade is a hydrogen atom abstraction in which carbon-hydrogen (C—H) bonds react with oxygen-centered radicals to generate oxygen-hydrogen (O—H) bonds, leaving behind a carbon-based radical that is subsequently converted into a C—O bond.

Moreover, carbon-based electrodes are able to catalyze the production of hydrogen gas. Hydrogen evolution catalysis proceeds via surface-bound hydrogen atoms, and surface oxides on carbon electrodes will bind hydrogen atoms relatively readily: at pH 7, onset of hydrogen evolution occurs at an approximate overpotential ($\eta$) of 0.75 V. At these potentials the fraction of charge that goes toward hydrogen production instead of the desired battery charge/discharge reaction can be considerable. This poses a substantial problem for all aqueous redox flow batteries because parasitic hydrogen production causes an imbalance in the population of the active redox species in each half cell. Over several hundred cycles, this imbalance adds up, leading to a steady decay in storage efficiency and premature device failure. To mitigate this problem, commercial redox flow batteries must utilize an auxiliary fuel cell to oxidize the parasitic hydrogen back to water and return the charge to the cell to rebalance the electrolyte populations.

Attempts have been made to passivate carbon electrodes by treatment with fluorine gas at high temperatures, with fluorine plasmas, and by mixing fluoropolymers with carbon substrates. But such techniques are variously time-consuming, energy-intensive, require high vacuum, and compromise conductivity through the carbon network.

SUMMARY OF THE INVENTION

Thus, there exists a need in the art for improved carbon passivation to improve the performance of carbon electrode materials. It is a realization of the inventors that carbon-fluorine (C—F) bonds will address both carbon corrosion and hydrogen catalysis. Where C—H bonds are susceptible to oxidation, the high C—F bond strength (>115 kcal/mol) and weak O—F bond strength (53 kcal/mol) make similar corrosion unlikely. Likewise, fluorides have extremely low proton affinity, and thus terminal C—F bonds should also render the electrode catalytically inert. It is a further realization of the inventors that a wet electrochemical method for fluorine-based passivation of carbon may not only prevent corrosion and hydrogen catalysis, but will do so while preserving the carbon's mesostructure, conductivity, and ability to transfer charge to supported catalysts and redox hosts. The electrode materials and methods described herein provide a carbon electrode material with a coating comprising a plurality of fluorine atoms.

In certain aspects, the electrode material described herein comprises a carbon-containing substrate with a surface and a plurality of $R_F$ moieties, wherein each $R_F$ moiety comprises at least one fluorine atom and is covalently bound to the surface.

In some implementations, each $R_F$ moiety covalently bound to the surface of the carbon-containing substrate is independently selected from the group consisting of alkyl, alkenyl, alkynyl, aryl, aralkyl, imine, ether, and sulfide. In some such implementations, each $R_F$ moiety covalently bound to the surface of the carbon-containing substrate is independently selected from the group consisting of alkyl, alkenyl, alkynyl, and aryl.

In some implementations, each $R_F$ moiety covalently bound to the surface of the carbon-containing substrate is independently selected from the group consisting of aryl. In some such implementations, each $R_F$ moiety covalently bound to the surface of the carbon-containing substrate is independently selected from the group consisting of phenyl, naphthyl, tolyl, thienyl, and indolyl; from the group consisting of perfluoroaryl; or from the group consisting of monofluorophenyl, difluorophenyl, trifluorophenyl, tetrafluorophenyl, perfluorophenyl, monofluoronaphthyl, difluoronaphthyl, trifluoronaphthyl, tetrafluoronaphthyl, pentafluoronaphthyl, hexafluoronaphthyl, and perfluoronaphthyl.

In some such implementations, each $R_F$ moiety covalently bound to the surface of the carbon-containing substrate is perfluorophenyl.

In some implementations, each $R_F$ moiety covalently bound to the surface of the carbon-containing substrate is independently selected from the group consisting of alkyl. In some such implementations, each $R_F$ moiety covalently bound to the surface of the carbon-containing substrate is independently selected from the group consisting of methyl, ethyl, propyl, cylcopropyl, butyl, cyclobutyl, pentyl, cyclopentyl, hexyl, and cyclohexyl; or from the group consisting of monofluoromethyl, difluoromethyl, perfluoromethyl, monofluoroethyl, difluoroethyl, trifluoroethyl, tetrafluoroethyl, and perfluoroethyl.

In some implementations, the carbon-containing substrate comprises a high-surface-area carbon (HSAC), such as carbon black, acetylene black, or some other suitable HSAC. In some implementations, the carbon-containing substrate comprises glass-like carbon.

In some implementations, the plurality of $R_F$ moieties forms a thin film on the surface of the carbon-containing substrate. In some such implementations, the thin film conforms to the surface of the carbon-containing substrate.

In some implementations, the plurality of $R_F$ moieties forms a monolayer, a sub-monolayer, or a multilayer.

In some implementations, the fluorine atoms in the plurality of $R_F$ moieties are less than 5% of the atoms in the electrode material. In some such implementations, the fluorine atoms in the plurality of $R_F$ moieties are less than 3% of the atoms in the electrode material.

In some implementations, the electrode material exhibits a current density for hydrogen evolution electrocatalysis of less than 1.5 mA per geometric cm$^2$ at −1 V versus the thermodynamic potential for hydrogen evolution under a given set of electrolyte conditions.

In some implementations, the electrode material exhibits low activity for hydrogen evolution catalysis after more than one hour of continuous polarization. In some implementations, the electrode material remains robust to vigorous mechanical agitation via sonication for more than two minutes.

In some implementations, a cyclic voltammetry (CV) scan of Ru(NH$_3$)$_6$Cl$_3$ recorded with a counterpart carbon-containing substrate without the plurality of $R_F$ moieties and a CV scan of Ru(NH$_3$)$_6$Cl$_3$ recorded with the electrode material have peak potentials within 50 mV of each other, and peak currents within about 10% of each other.

In some implementations, the charge transfer rate between a counterpart carbon-containing substrate without the plurality of $R_F$ moieties and a solution is less than twice the charge transfer rate between the electrode material and the solution.

In certain aspects, the electrode material described herein may be a component of one or more of a lithium ion battery, a redox flow battery, a fuel cell, a supercapacitor, a potential swing gas separator, an electrolyzer, a sodium ion battery, an electrochemical sensor, or some other suitable device.

In certain aspects, the methods described herein prepare an electrode material. A carbon-containing substrate is provided under a pressure, and is contacted with a solution at a temperature and under the pressure. The solution comprises a compound represented by X—$R_F$, where $R_F$ and X are covalently linked. $R_F$ is a moiety comprising at least one fluorine atom. X is independently selected from the group consisting of H$_2$NNH—, halide, —N$_2^+$Y$^-$, —OC(S)S$^-$M$^+$, and —SO$_2$Cl. Y$^-$ is an inorganic or organic anion; M$^+$ is an alkali metal cation, alkaline earth cation, or ammonium ion comprising a fluorinated carbon-containing compound. At least one polarization cycle is applied to the carbon-containing substrate at the pressure. A polarization cycle comprises increasing and decreasing the potential of the carbon-containing substrate relative to a reversible hydrogen electrode (RHE), thereby preparing the electrode material.

In some implementations, the $R_F$ moiety is alkyl, alkenyl, alkynyl, aryl, aralkyl, imine, ether, or sulfide.

In some implementations, the $R_F$ moiety is aryl. In some such implementations, the $R_F$ moiety is phenyl, naphthyl, tolyl, thienyl, or indolyl. In some implementations, the $R_F$ moiety is is perfluoroaryl. In some implementations, the $R_F$ moiety is monofluorophenyl, difluorophenyl, trifluorophenyl, tetrafluorophenyl, perfluorophenyl, monofluoronaphthyl, difluoronaphthyl, trifluoronaphthyl, tetrafluoronaphthyl, pentafluoronaphthyl, or perfluoronaphthyl. In some implementations, the $R_F$ moiety is perfluorophenyl.

In some implementations, the $R_F$ moiety is alkyl. In some such implementations, the $R_F$ moiety is methyl, ethyl, propyl, cylcopropyl, butyl, cyclobutyl, pentyl, cyclopentyl, hexyl, or cyclohexyl. In some implementations, the $R_F$ moiety is monofluoromethyl, difluoromethyl, perfluoromethyl, monofluoroethyl, difluoroethyl, trifluoroethyl, tetrafluoroethyl, or perfluoroethyl.

In some implementations, X is H$_2$NNH—. In some such implementations, X—$R_F$ is perfluorophenyl hydrazine. In some such implementations, the concentration of perfluorophenyl hydrazine in the solution is about 1.0 mM.

In some implementations, X is —N$_2^+$Y$^-$, wherein Y$^-$ is an inorganic or organic anion. In some such implementations, Y$^-$ is a halide.

In some implementations, X is a halide. In some such implementations, X is bromide or iodide.

In some implementations, X is -OCS$_2^-$M$^+$, wherein M$^+$ is an alkali metal cation, alkaline earth cation, or ammonium ion. In some such implementations, M$^+$ is Na$^+$ or K$^+$.

In some implementations, X is —SO$_2$Cl.

In some implementations, the solution is an aqueous solution. In some such implementations, the solution is a phosphate buffer. In some implementations, the solution has a pH from about 0 to about 8.

In some implementations, the carbon-containing substrate comprises a high-surface-area carbon (HSAC), such as carbon black, acetylene black, or some other suitable HSAC. In some implementations, the carbon-containing substrate comprises glass-like carbon.

In some implementations, the plurality of $R_F$ moieties forms a thin film on the surface of the carbon-containing substrate. In some such implementations, the thin film conforms to the surface of the carbon-containing substrate.

In some implementations, the temperature of the solution is less than 30° C.

In some implementations, the at least one polarization cycle includes increasing the potential of the carbon-containing substrate to at least 0.2 V relative to the reversible hydrogen electrode (RHE). In some implementations, the at least one polarization cycle includes increasing the potential of the carbon-containing substrate to at least 1.5 V relative to the reversible hydrogen electrode (RHE).

In some implementations, the pressure is about 0.9 to about 1.1 atmospheres.

In some implementations, the carbon-containing substrate is rotated during at least one polarization cycle.

In some implementations, each polarization cycle further comprises generating a first average current density in the carbon-containing substrate for a first period and generating a second average current density in the carbon-containing substrate for a second period. In such implementations, the period of each polarization cycle is no more than 110% of the sum of the first period and the second period. In some such implementations, the first period is less than or equal to ten seconds. In some such implementations, the first period is less than or equal to 500 milliseconds. In some implementations, the average length of each polarization cycle is less than or equal to one second.

In some implementations, each polarization cycle further comprises maintaining a first average potential in the carbon-containing substrate relative to the RHE for a first period and generating a second average potential of the carbon-containing substrate relative to the RHE for a second period. In such implementations, the period of each polarization cycle is no more than 110% of the sum of the first period and the second period. In some such implementations, the first period is less than or equal to ten seconds. In some such implementations, the first period is less than or equal to 500 milliseconds. In some implementations, the average length of each polarization cycle is less than or equal to one second.

In some implementations, each polarization cycle further comprises maintaining a first average potential in the carbon-containing substrate relative to the RHE for a first period and generating a second average current density in the carbon-containing substrate for a second period. In such implementations, the period of each polarization cycle is no more than 110% of the sum of the first period and the second period. In some such implementations, the first period is less than or equal to ten seconds. In some such implementations, the first period is less than or equal to 500 milliseconds. In some implementations, the average length of each polarization cycle is less than or equal to one second.

In some implementations, each polarization cycle further comprises generating a first average current density in the carbon-containing substrate for a first period and generating a second average potential of the carbon-containing substrate relative to the RHE for a second period. In such implementations, the period of each polarization cycle is no more than 110% of the sum of the first period and the second period. In some such implementations, the first period is less than or equal to ten seconds. In some such implementations, the first period is less than or equal to 500 milliseconds. In some implementations, the average length of each polarization cycle is less than or equal to one second.

DETAILED DESCRIPTION OF THE INVENTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the electrode materials, systems, and methods described herein.

The compositions, systems, and methods described herein relate to an electrode material with terminal C—F bonds. A carbon-containing substrate is contacted with a solution comprising a fluorinated carbon-containing compound. At least one polarization cycle is applied to the carbon-containing substrate contacted with the solution, which may generate fluorine-containing, carbon-based radicals. Such radicals may then covalently combine with the electrode surface, such that the electrode material comprises a plurality of fluorine-containing moieties covalently bound to the surface of the carbon-containing substrate.

Figure 1:
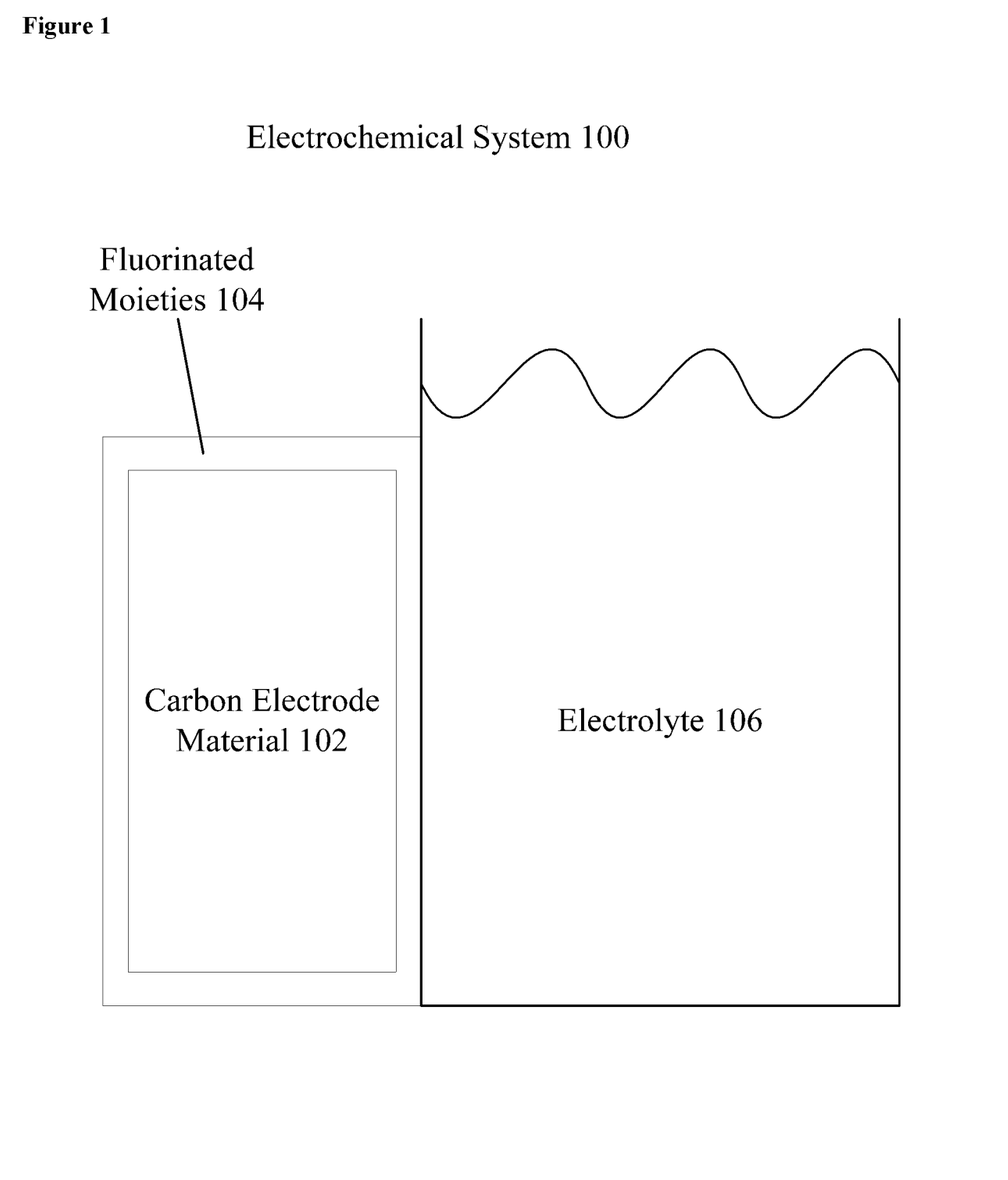
FIG. 1 is a diagram of an electrochemical system, according to an illustrative implementation.

FIG. 1 is an illustrative diagram of an electrochemical system 100. As depicted, electrochemical system 100 may be a component of a redox flow cell, a lithium air battery, a PEM fuel cell, an electrolyzer, a sodium ion battery, or some other suitable electrochemical system. Electrochemical system 100 comprises a carbon electrode material 102 with terminal fluorinated moieties 104 that are in contact with electrolyte 106.

Carbon electrode material 102 is a carbon-containing substrate, which may include a glassy carbon, a high-surface-area carbon such as carbon black or acetylene black, or some other carbon-containing substrate.

Fluorinated moieties 104 are moieties including at least one fluorine atom, and are covalently bonded to carbon electrode material 102. Fluorinated moieties 104 may compose a conformal film, a thin film, a monolayer, a sub-monolayer, a multilayer, or some other suitable coating of carbon electrode material 102. Fluorinated moieties 104 may comprise perfluoroaryl groups. In some implementations, the fluorine atoms in fluorinated moieties 104 may comprise less than 5% of the atoms in carbon electrode material 102; in some implementations, such fluorine atoms may comprise less than 3% of the atoms in carbon electrode material 102.

Electrolyte 106 may be a solid solution, a liquid solution, or some other suitable solution that is in contact with the fluorinated moieties 104. In some implementations, electrolyte 106 may be a Bronsted acid.

As depicted, electrochemical system 100 is part of a system in which charge is transferred between the carbon electrode material 102 and electrolyte 106 through fluorinated moieties 104. The fluorine atoms in fluorinated moieties 104 allow charge transfer between electrolyte 106 and the carbon electrode material 102 while reducing or eliminating catalysis of hydrogen evolution in electrolyte 106 by carbon electrode material 102 and corrosion of carbon electrode material 102 by electrolyte 106.

Figure 2:
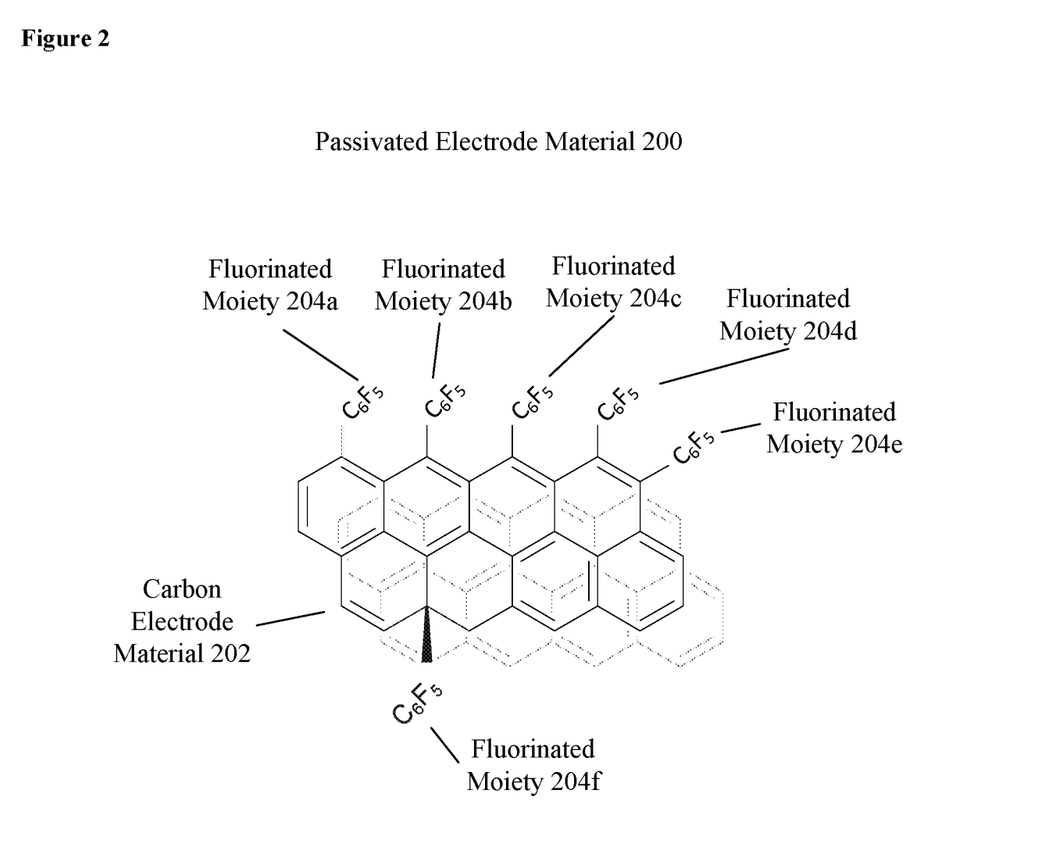
FIG. 2 is a diagram of a carbon electrode material passivated with a fluorine-containing coating, according to an illustrative implementation.

FIG. 2 is an illustrative diagram of a passivated electrode material 200. Referring to FIG. 1, passivated electrode material 200 is an implementation of carbon electrode material 102 and fluorinated moieties 104. As depicted, carbon electrode 202 is an exemplary carbon electrode material 102, and fluorinated moieties 204a-f (collectively, fluorinated moieties 204) represent exemplary fluorinated moieties 104. Fluorinated moieties 204 may include one or more alkyls, alkenyls, alkynyls, aryls, aralkyls, imines, ethers, sulfides, or other suitable moieties. As described in relation to FIG. 3, fluorinated moieties 204 may be derived from fluorinated aryl or alkyl hydrazines.

Figure 3:
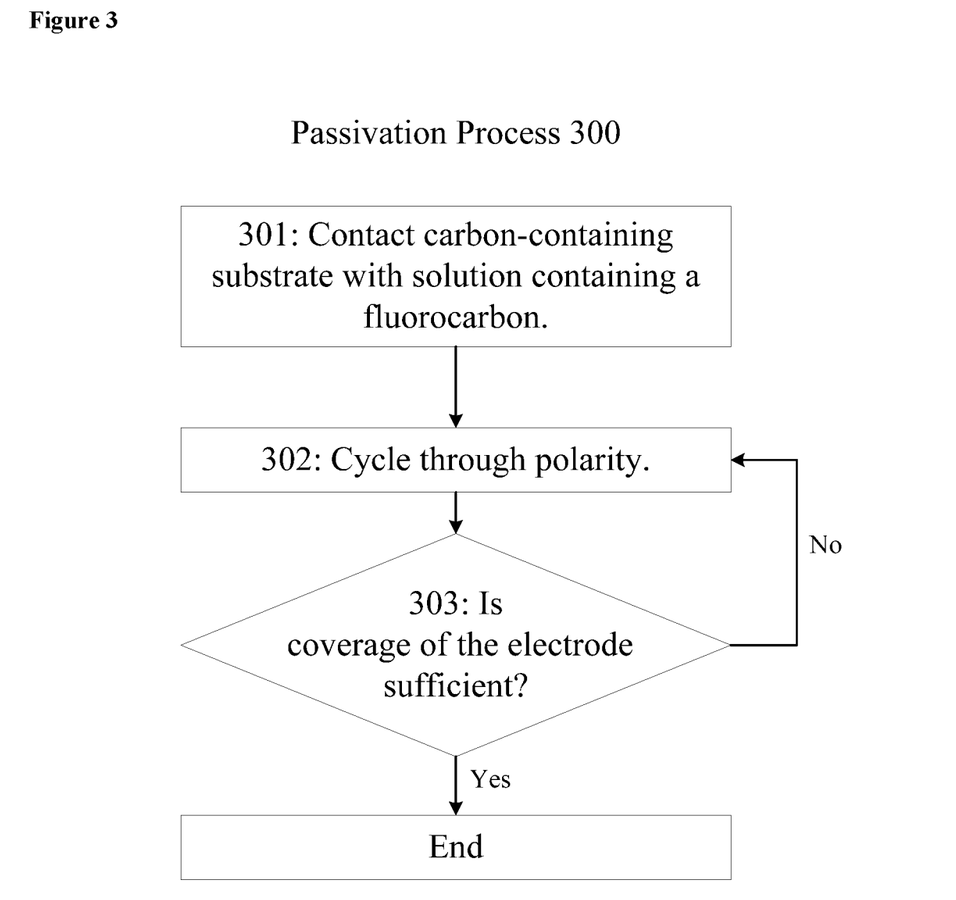
FIG. 3 is a flow chart of a process for preparing an electrode material, according to an illustrative implementation.

FIG. 3 is an illustrative flow chart of a passivation process 300. Passivation process 300 chemically links fluorine atoms to a carbon substrate, passivating the substrate, which may then be used in an electrochemical system such as that depicted in FIG. 1. Passivation process 300 begins with step 301, in which a carbon-containing substrate, such as carbon-containing electrode material 102, is placed in contact with a solution containing a fluorocarbon at a temperature and a pressure. The carbon-containing substrate may be a material that has undergone one or more stages of electrode or membrane electrode assembly fabrication employed in the battery and fuel cell industries. The solution may be an aqueous solution, and may include a compound represented by X—$R_F$, where $R_F$ is a moiety comprising at least one fluorine atom. X—$R_F$ may be perfluorophenyl hydrazine, some other suitable fluorinated hydrazine derivative, a long-chain perfluoroalkyl-substituted aromatic scaffold, or some other suitable fluorocarbon. As an illustrative example of such a solution, the solution may be a 1.6 mM solution of perfluorophenyl hydrazine in a pH 7 phosphate buffer. In some implementations, the fluorocarbon may be introduced to the solution as a hydrazinium salt. In some implementations, the fluorocarbon may be prepared via a single- or multi-step cross-coupling reaction from a commercial precursor. In some implementations, the pressure may be between about 0.7 to about 1.5 atmospheres, about 0.8 to about 1.3 atmospheres, about 0.9 to about 1.1 atmospheres, or about 1 atmosphere. In some implementations, the temperature may be less than 30° C., less than 28° C., less than 25° C., or less than 22° C.

Once the carbon-containing substrate is exposed to the solution, passivation process 300 continues with step 302, in which the polarity of the carbon-containing substrate is cycled above and below a polarity relative to an RHE. In some implementations, the potential of the carbon-containing substrate is increased to at least 0.2 V, 0.5 V, 0.75 V, 1 V, 1.25 V, 1.5 V, or 2 V relative to the RHE. Under an oxidizing potential, a carbon-based radical that is bound to one or more fluorine atoms is generated from the fluorocarbon. Such radicals may then covalently bond to the carbon-containing substrate. The following scheme represents an illustrative reaction that may take place during step 302:

In this illustrative example, a perfluorophenyl hydrazine is oxidized, generating a carbon-based radical. The radical then replaces a C—H bond at the surface of a carbon-containing substrate with a C—C bond, and thereby places C—F bonds at the outer surface of the carbon-containing substrate. The depicted reaction is only exemplary: other suitable reactions may take place during step 302. In some implementations, the polarization cycle is completed in less than 10 seconds, in less than 5 seconds, in less than one second, or in less than 0.5 seconds. In some implementations, the carbon-containing substrate is rotated during the polarization cycle.

Step 303 determines whether the electrode has been sufficiently coated with fluorinated moieties. Such a determination may be based on the output of a cyclic voltammogram, as described in relation to FIG. 4; on the amount of hydrogen catalysis observed when the coated carbon-containing substrate is placed at a negative polarity relative to an RHE; on whether the carbon-containing substrate has undergone a predetermined number of polarization cycles; on whether the carbon-containing substrate has been placed at a predetermined oxidizing potential for longer than a predetermined amount of time; or based on some other suitable criterion. If the electrode coating is complete, process 300 ends; otherwise, process 300 returns to step 302 to bond more fluorinated moieties to the carbon-containing substrate.

Having described the electrode material and methods, the same will be more clearly understood by reference to the following examples, which are included herewith for purposes of illustration only and are not intended to be limiting of the invention.

EXAMPLE

Example 1

Figure 4:
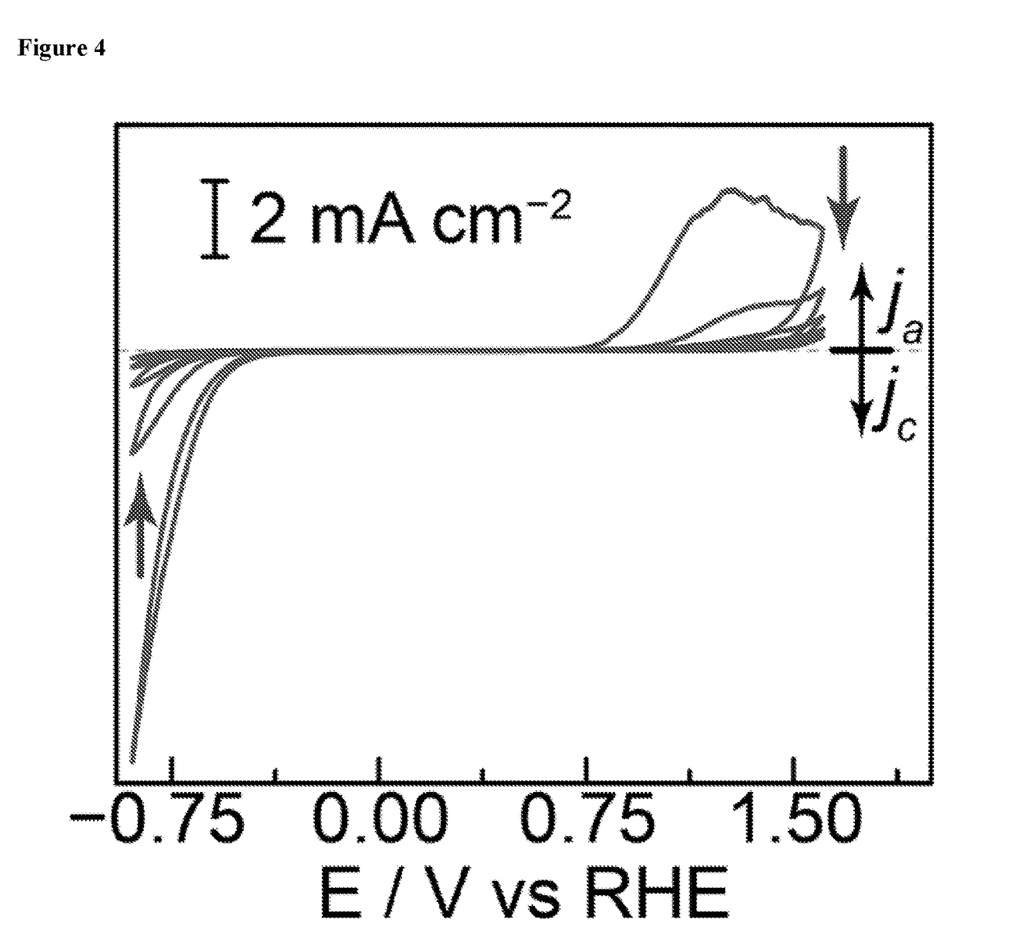
FIG. 4 is a graph depicting cyclic voltammetry of a carbon electrode in a 1.6 mM solution of $C_6F_5NHNH_2$.

1.6 mM Solution of Perfluorophenyl Hydrazine on pH 7 Phosphate Buffer; Glassy Carbon Substrate A glassy carbon electrode was characterized before and after being passivated as described in relation to FIG. 3. In particular, the glassy carbon electrode was passivated in a 1.6 mM solution of perfluorophenyl hydrazine (depicted in Eq. 3) in pH 7 phosphate buffer. The resulting cyclic voltammogram (CV) is shown in FIG. 4. The arrows in FIG. 4 indicate the change in output following repeated cycles of increasing and decreasing the polarization of the electrode relative to an RHE. Thus, during the first cycle, ~1.2 V relative to the RHE generated a broad oxidation wave, and hydrogen evolution electrocatalysis occurred near −0.75 V relative to the RHE. As more polarization cycles were performed, the current near −0.75 V fell, consistent with an increasingly extensive fluorine-containing coating blocking hydrogen access to catalytic sites on the glassy carbon. Thus, with respect to FIG. 3, FIG. 4 suggests a possible criterion for step 303: process 300 may complete once the current at −0.75 V relative to the RHE falls below a predetermined level.

Figure 5:
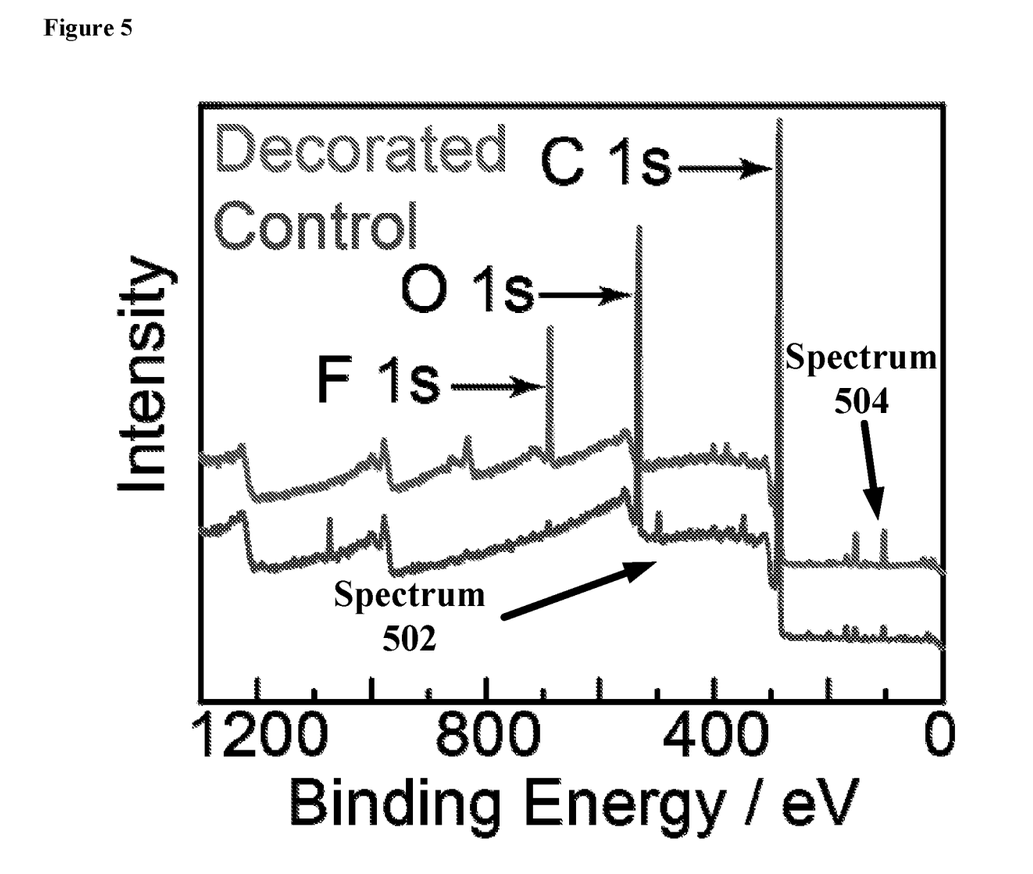
FIG. 5 is a graph depicting X-ray photoelectron spectra (XPS) of a carbon-containing substrate before and after passivation.

FIG. 5 depicts XPS measurements taken before and after the glassy carbon electrode was passivated, and confirm fluorination of the electrode. In spectrum 502, taken before passivation, the XPS measurements include signals from carbon and oxygen, but not fluorine; spectrum 504, taken after passivation, includes a strong fluorine signal, confirming fluorination of the electrode.

Figure 6:
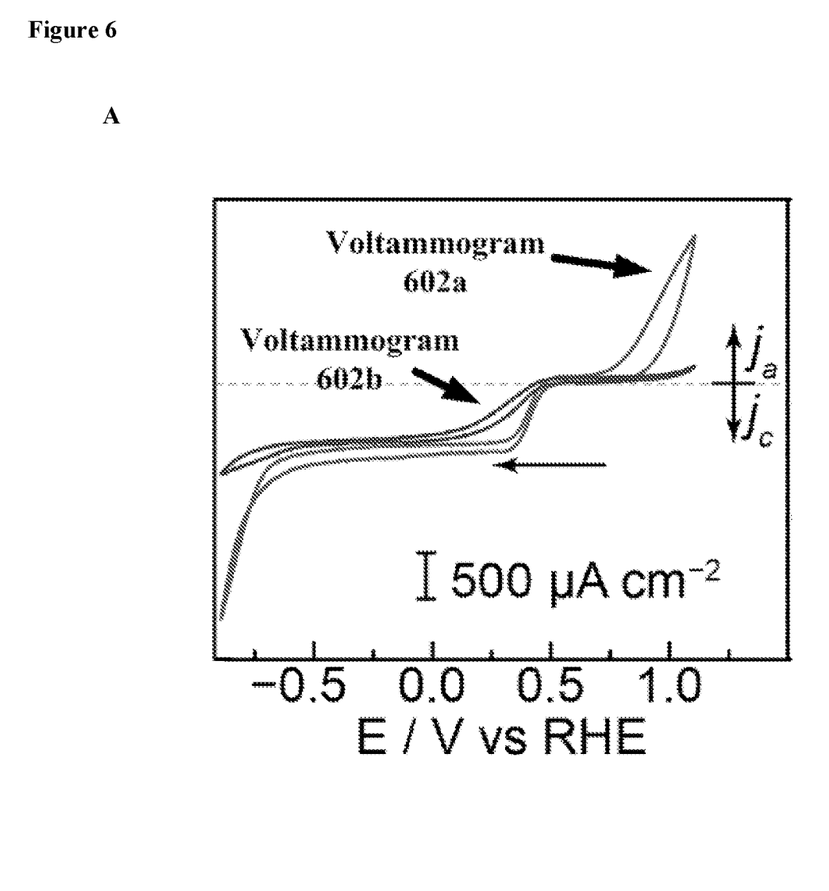
FIG. 6 includes two panels (Panels A and B). Panel A is a graph depicting cyclic voltammetry with a rotating disc electrode of a glassy carbon electrode, both before and after passivation; Panel B is a graph depicting cyclic voltammetry of a glassy carbon electrode in a quiescent solution, both before and after passivation.

FIG. 6, panel A, depicts cyclic voltammograms of the glassy carbon electrode with a rotating disc electrode before and after 50 deposition cycles. The disc electrode was rotated at 2000 rpm, and the CV was performed at 50 mV/s. Voltammogram 602a represents the measurements taken of the glassy carbon electrode before passivation, and voltammogram 602b represents the measurements taken of the glassy carbon electrode after passivation. Near −0.75 V, voltammogram 602a shows a current nearly an order of magnitude greater than the current at the same point in voltammogram 602b, indicating a corresponding decrease in hydrogen evolution.

FIG. 6, panel B, also depicts cyclic voltammograms of the glassy carbon electrode before and after 50 deposition cycles, but in quiescent solution with an Ru(NH$_3$)$_6$Cl$_3$ electrode and performed at 20 mV/s. The Ru(NH$_3$)$_6$Cl$_3$ electrode is a probe of the rate of outer-sphere charge transfer, and thus a CV performed with the Ru(NH$_3$)$_6$Cl$_3$ electrode indicates shifts in the ability of the passivated carbon electrode to carry out its charge transfer function in an electrochemical device. Voltammogram 604a represents the measurements taken of the glassy carbon electrode before passivation, and voltammogram 604b represents the measurements taken of the glassy carbon electrode after passivation. The small (<10%) difference in the peak currents and peak potentials of voltammograms 604a and 604b indicate that passivating the electrode has a correspondingly small effect on the rate of charge transfer between the electrode and an electrolyte even though the passivating coating inhibits harmful surface reactivity.

Example 2

Figure 7:
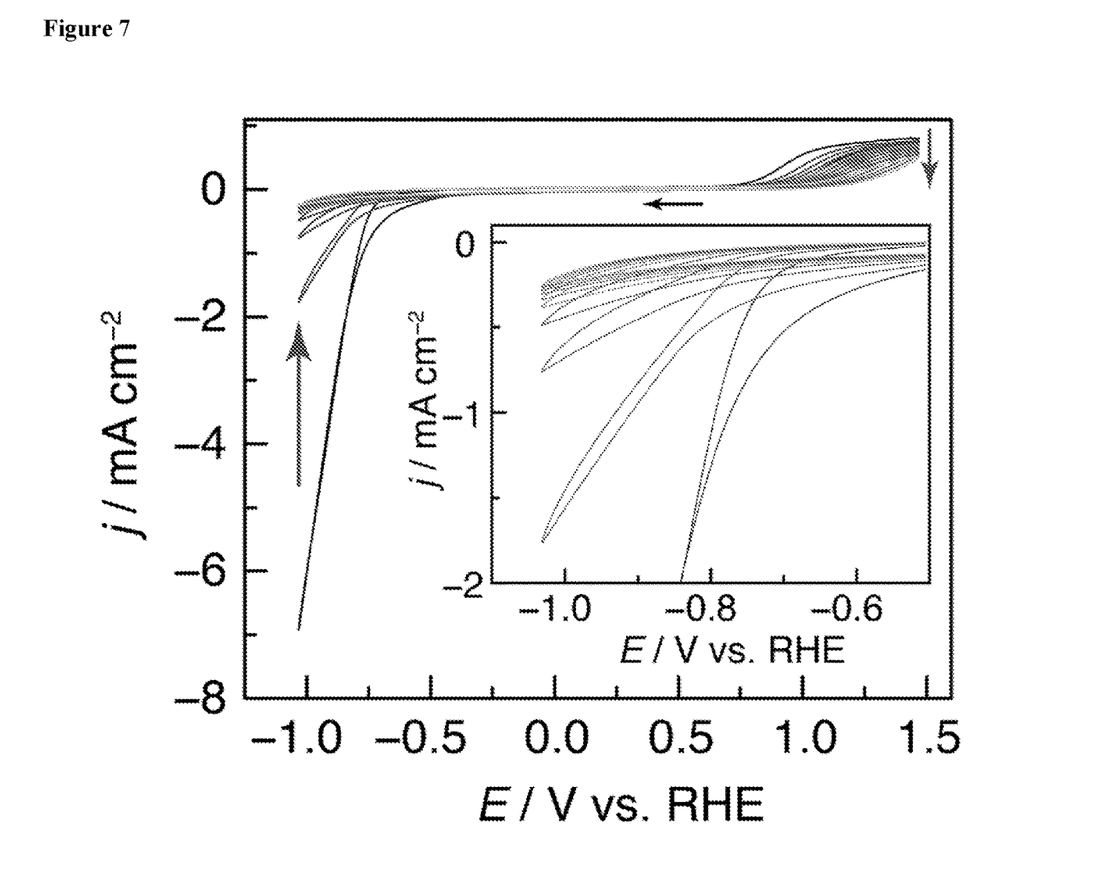
FIG. 7 is a graph depicting cyclic voltammetry of a carbon electrode in a 1.0 mM solution of $C_6F_5NHNH_2$.
Figure 8:
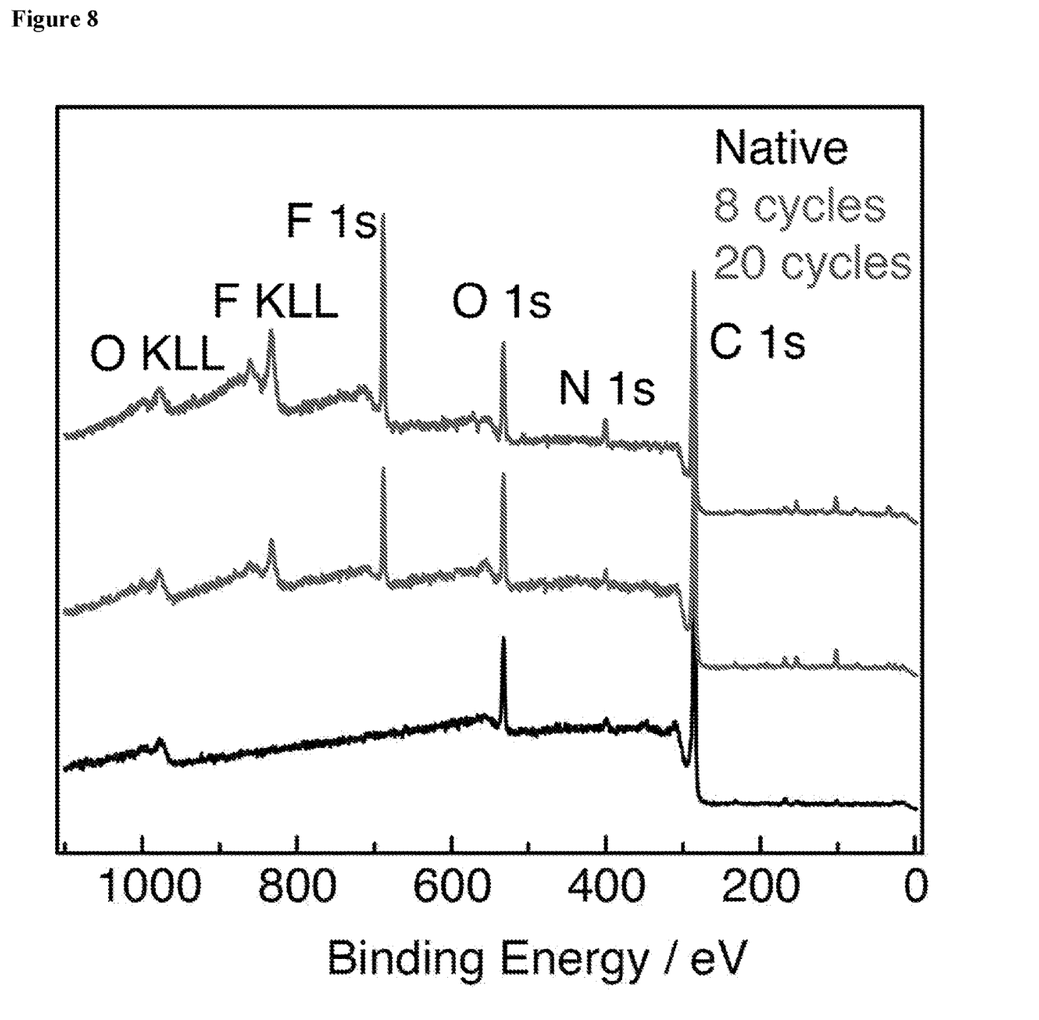
FIG. 8 is a graph depicting X-ray photoelectron spectra (XPS) of a carbon-containing substrate before (bottom spectrum) and after two levels (middle and top spectra) of passivation with fluorine-containing compound. The middle spectrum is after 8 cycles of passivation, and the top spectrum is after 20 cycles. There is a monotonic increase on fluorine content with increasing number of passivation cycles.
Figure 9:
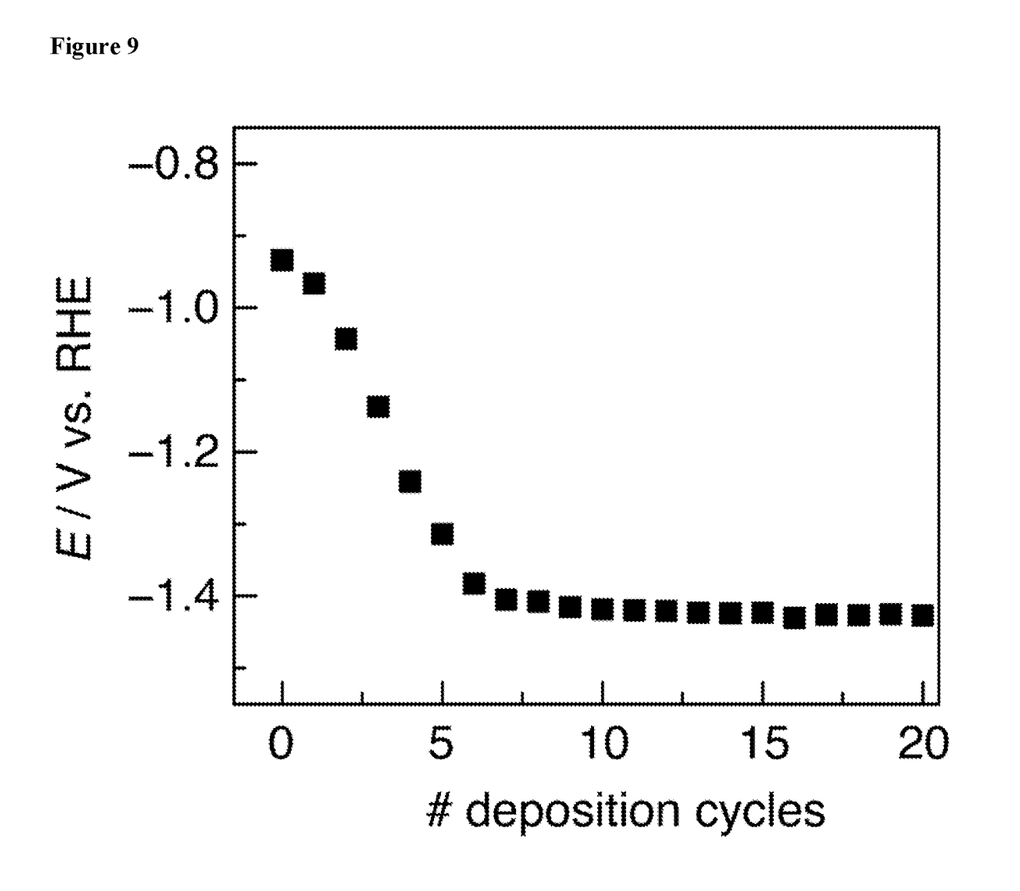
FIG. 9 is a graph depicting passivation performance of coated electrodes. Each data point shows the cathodic potential required to sustain hydrogen evolution at $-1$ mA cm$^{-2}$ in pH 7 phosphate on a rotating disk electrode, 2000 rpm. Total passivation performance is approximately 500 mV.
Figure 10:
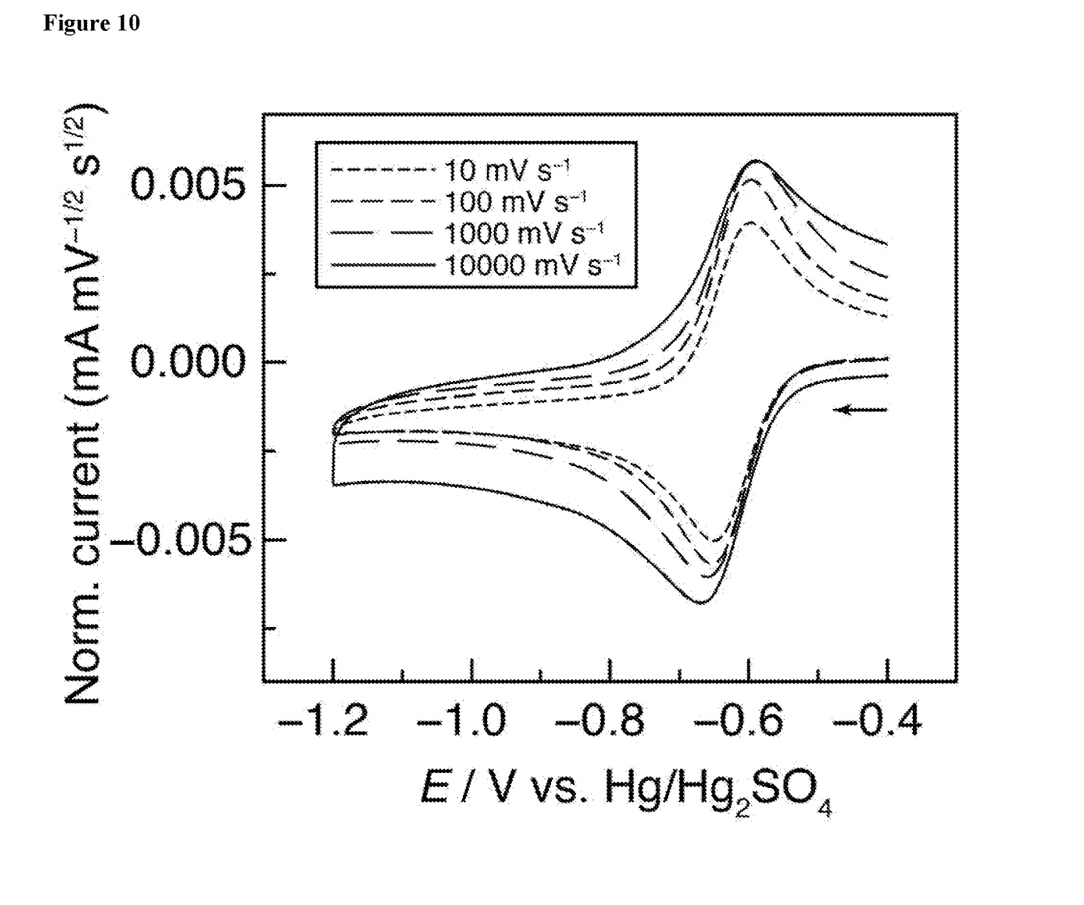
FIG. 10 is a graph depicting cyclic voltammetry with a native carbon material at various scan rates.
Figure 11:
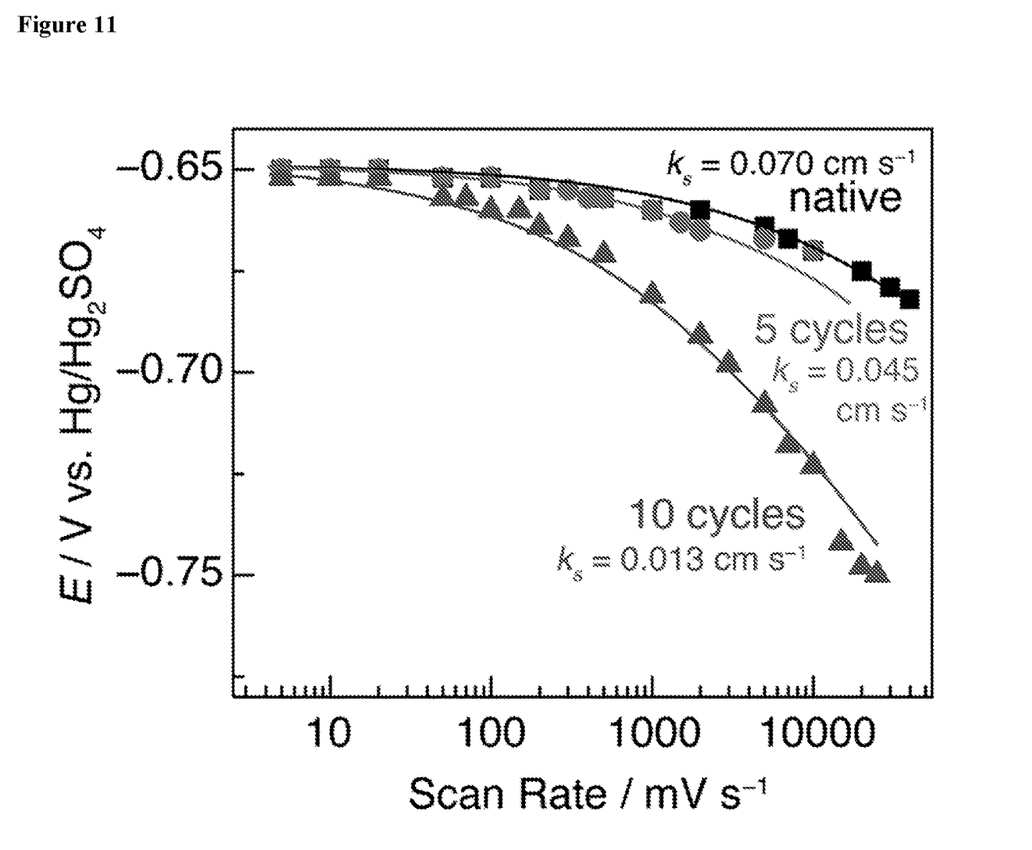
FIG. 11 is a graph depicting outer-sphere charge transfer rates of electrodes at various degrees of passivation. The difference in rate constant between 0 and 5 cycles is small compared to the difference in hydrogen evolution activity on those same electrodes (see FIG. 9)

1.0 mM Solution of Perfluorophenyl Hydrazine on pH 7 Phosphate Buffer; Glassy Carbon Substrate A glassy carbon electrode was characterized before and after being passivated as described in relation to FIG. 3. In particular, the glassy carbon electrode was passivated in a 1.0 mM solution of perfluorophenyl hydrazine (depicted in Eq. 3) in pH 7 phosphate buffer. The resulting cyclic voltammogram (CV) is shown in FIG. 7. The arrows in FIG. 7 indicate the change in output following repeated cycles of increasing and decreasing the polarization of the electrode relative to an RHE. As polarization cycles were performed, the current near −1.0 V fell, consistent with an increasingly extensive fluorine-containing coating blocking hydrogen access to catalytic sites on the glassy carbon. Thus, with respect to FIG. 3, FIG. 7 may also suggest a possible criterion for step 303: process 300 may complete once the current at −1.0 V relative to the RHE falls below a predetermined level.

EQUIVALENTS

While various embodiments of the present disclosure have been shown and described herein, it will be obvious to those skilled in the art that such embodiments are provided by way of example only. Numerous variations, changes, and substitutions will now occur to those skilled in the art without departing from the disclosure. Examples include using more than one fluorocarbon moieties (such as alkyl, alkenyl, alkynyl, aryl, aralkyl, imine, ether, sulfide, or other suitable moieties), using other fluorine-containing compounds, using other carbon-containing substrates, using other electrode material substrates, using a pulsed current polarization cycle, and using a pulsed voltage polarization cycle. It should be understood that various alternatives to the embodiments of the disclosure described herein may be employed in practicing the disclosure. Elements of an implementation of the electrode materials, devices, and methods described herein may be independently implemented or combined with other implementations, and may be changed or modified within a wide and equivalent range of conditions, formulations, and other parameters without affecting the scope of such electrode materials, devices, or methods. Such changes or modifications are intended to be encompassed within the scope of the appended claims.

The invention claimed is:

1. An electrode material, comprising:
   a carbon-containing substrate, comprising a surface; and
   a plurality of $R_F$ moieties;
   wherein each $R_F$ moiety is independently selected from aryl; each $R_F$ moiety is covalently bound to the surface; and each $R_F$ moiety comprises at least one fluorine atom.

2. The electrode material of claim 1, wherein each $R_F$ moiety is independently selected from the group consisting of phenyl, naphthyl, tolyl, thienyl, and indolyl.

3. The electrode material of claim 1, wherein each $R_F$ moiety is independently selected from the group consisting of perfluoroaryl.

4. The electrode material of claim 1, wherein each $R_F$ moiety is independently selected from the group consisting of monofluorophenyl, difluorophenyl, trifluorophenyl, tetrafluorophenyl, perfluorophenyl, monofluoronaphthyl, difluoronaphthyl, trifluoronaphthyl, tetrafluoronaphthyl, pentafluoronaphthyl, hexafluoronaphthyl, and perfluoronaphthyl.

5. The electrode material of claim 4, wherein each $R_F$ moiety is perfluorophenyl.

6. The electrode material of claim 1, wherein the carbon-containing substrate comprises high-surface-area carbon.

7. The electrode material of claim 1, wherein the carbon-containing substrate comprises glass-like carbon.

8. The electrode material of claim 1, wherein the fluorine atoms in the plurality of $R_F$ moieties are less than 5% of the atoms in the electrode material.

9. A lithium ion battery, comprising the electrode material of claim 1.

10. A redox flow battery, comprising the electrode material of claim 1.

11. A fuel cell, comprising the electrode material of claim 1.

12. A supercapacitor, comprising the electrode material of claim 1.

13. The electrode material of claim 3, wherein the carbon-containing substrate comprises high-surface-area carbon.

14. The electrode material of claim 3, wherein the carbon-containing substrate comprises glass-like carbon.

15. The electrode material of claim 3, wherein the fluorine atoms in the plurality of $R_F$ moieties are less than 5% of the atoms in the electrode material.

16. The electrode material of claim 5, wherein the carbon-containing substrate comprises high-surface-area carbon.

17. The electrode material of claim 5, wherein the carbon-containing substrate comprises glass-like carbon.

18. The electrode material of claim 5, wherein the fluorine atoms in the plurality of $R_F$ moieties are less than 5% of the atoms in the electrode material.

* * * * *